US006898432B1

(12) United States Patent
Jiang (10) Patent No.: US 6,898,432 B1
(45) Date of Patent: May 24, 2005

(54) ROUTE-BASED COMMUNICATION PLANNING ARCHITECTURE AND METHOD FOR WIRELESS COMMUNICATION

(75) Inventor: Xi Jiang, Santa Clara, CA (US)

(73) Assignee: DaimlerChrysler Research and Technology North America, Inc., Palo Alto, CA (US)

( * ) Notice: Subject to any disclaimer, the term of this patent is extended or adjusted under 35 U.S.C. 154(b) by 538 days.

(21) Appl. No.: 09/718,007

(22) Filed: Nov. 21, 2000

(51) Int. Cl.$^7$ .................................................. H04Q 7/20
(52) U.S. Cl. .............................. 455/456.1; 455/414.2; 455/432.1; 455/552.1; 455/553.1; 370/310.2; 370/331; 370/338
(58) Field of Search ................................ 455/414, 422, 455/432, 440, 456, 457, 414.1, 432.1, 553.1, 552.1, 414.2; 370/310.2, 331, 338

(56) References Cited

U.S. PATENT DOCUMENTS

| | | | | |
|---|---|---|---|---|
| 5,493,291 A | * | 2/1996 | Bruggemann | 340/905 |
| 5,530,917 A | * | 6/1996 | Andersson et al. | 455/436 |
| 5,572,221 A | * | 11/1996 | Marlevi et al. | 342/452 |
| 5,825,759 A | * | 10/1998 | Liu | 370/331 |
| 6,125,278 A | * | 9/2000 | Wieczorek et al. | 455/437 |
| 6,185,413 B1 | * | 2/2001 | Mueller et al. | 455/405 |
| 6,282,412 B1 | * | 8/2001 | Lyons | 455/186.1 |
| 6,298,302 B2 | * | 10/2001 | Walgers et al. | 701/209 |
| 6,363,323 B1 | * | 3/2002 | Jones | 701/213 |
| 6,385,454 B1 | * | 5/2002 | Bahl et al. | 455/450 |
| 6,473,602 B1 | * | 10/2002 | Bottomley | 455/226.1 |
| 6,505,046 B1 | * | 1/2003 | Baker | 455/456.3 |

FOREIGN PATENT DOCUMENTS

| | | |
|---|---|---|
| EP | 0199266 | 10/1986 |
| EP | 1085696 | 3/2001 |
| WO | 99/59363 | 11/1999 |

OTHER PUBLICATIONS

Dr. William Lee, "The Proper Statistical Nature of Measuring and Estimating" Airtouch Communications, 1999, pp. 753–756.*

IEICE Trans. Commun., vol. E83–B, No. 8, Aug. 2000 entitled "An Adaptive Radio Link Protocol for Efficient Packet Transmission in Infostation Systems" Hua Mao et al., pp. 1–10.

"Route Dependent Communication Planning for Vehicular Telematics Services" by Daniel Jiang et al., pp. 1–7, published May 2000.

* cited by examiner

Primary Examiner—William Trost
Assistant Examiner—Stephen D'Agosta
(74) Attorney, Agent, or Firm—Crowell & Moring LLP (57) ABSTRACT

A method for selecting which of a plurality of wireless communication options will be used by a mobile communication device based on the location of the device on a route, the route, and the availability of each of the wireless communication options along the route. Information indicative of coverage areas for the wireless communication options available along the route are stored in a database. In a further embodiment, selection of a wireless communications option may be based on the needs of application programs that use the mobile communication device. In another embodiment, a request for information is sent from the vehicle to a wireless communications network, and the information is routed, based on a predicted time when the vehicle will be able to communicate with an info-fueling station, to the info-fueling station and downloaded to the vehicle.

8 Claims, 10 Drawing Sheets

22
<HW101, (x1,y1), MAN boundary>
<HW101, (x2,y2), MAN boundary>
... ... ...
<HW85, (x5,y5), MAN boundary>
... ... ...
<HW280, (x8,y8), MAN boundary>
... ... ...

ROUTE-BASED COMMUNICATION PLANNING ARCHITECTURE AND METHOD FOR WIRELESS COMMUNICATION

This invention relates to mobile wireless communication, and more particularly, to a method of planning which of various wireless communication options to utilize for wireless communication in a mobile environment when one or more wireless communication options may be available for use, based on the location of the mobile user, the route the mobile user is travelling, and the availability of the various wireless communication options along the route.

BACKGROUND OF THE INVENTION

Increasing numbers of vehicles come equipped with some form of "telematics" service platforms. Telematics services are those services enabled by a three-way marriage among vehicles, computing and communication technologies, and is sometimes used to mean the wireless linkage of vehicles to data networks, particularly the internet. These telematics service platforms are able to carry out various intelligent transportation system services, such as reporting a vehicle's status and position to a service center and provide certain applications such as emergency and safety assistance. In the next few years, more telematics products will be made available and eventually, most if not all vehicles will have some form of telematics platform that will offer various services, such as emergency services (e.g., emergency communication in the event of an incident, such as airbag deployment), navigation services, concierge and transaction services (e.g., restaurant information, hotel reservation), communication and personal information services (e.g., E-mail, calendar services), information services (e.g., stock information, personalized news, sightseeing information), entertainment services (e.g., interactive games, music downloads), and so forth.

These telematics service platforms require the use of some type of wireless communication. Since wireless communication is generally expensive relative to non-wireless communication (e.g., cellular phone calls versus land line phone calls), the ability of these telematics products to use wireless communication options in the most cost effective manner will be an important factor in the success of vehicular telematics. By wireless communication options, it is meant the various wireless communication networks available, discussed below, the various levels of service that each type of wireless communication network has available (i.e. transmission power level), as well as any other option that may now be available or will be available in the future for wireless communication.

In the near future, a variety of wireless communication options will be available for use by wireless communication devices in vehicles, such as satellite, cellular phone and short-range radio frequency (RF) links. These systems differ in cost, bandwidth and coverage. For example, in urban areas and along the major highways, emerging technologies, such as GPRS (general packet radio service) will be deployed in the U.S. in the next few years and will offer "always-on connections" and packet oriented data communications at higher bandwidths than today. Improved code division multiple access (CDMA) technology such as W-CDMA will also likely be established. Also, the Ricochet 2 metropolitan area access (MAN) wireless network will soon be available in 48 major metropolitan areas in the United States covering a very large percentage of the population. These new wireless networks typically provide a higher bandwidth than existing wireless networks, such as the first generation cellular network (AMPS—Advanced Mobile Phone System) and the second-generation cellular networks (GSM—Global System for Mobile Communications; CDMA—Code Division Multiple Access; and TDMA—Time Division Multiple Access).

A general method to evaluate the existing and emerging wireless communication networks and services for data communication is to examine their cost and performance levels. The first generation AMPS cellular systems typically have a maximum data transfer rate of 9600 bps and the second generation digital wireless communication systems have a maximum bandwidth of 14.4 kbps. The new third generation cellular systems will have maximum bandwidths of around 128 kbps or even 384 kbps. Since the charge for cellular communication is high, particularly when compared to even interstate land line phone calls, the cost for transferring data using these systems can be quite high. For example, the cost to transfer one mega-byte of data using the second generation digital wireless communication systems runs around $15.00 or higher. If a mobile user wants to obtain a large amount of content, the cost of doing so with cellular wireless communication can be quite high, making mobile data communication involving large amounts of data cost prohibitive to many potential users.

Figure 1:
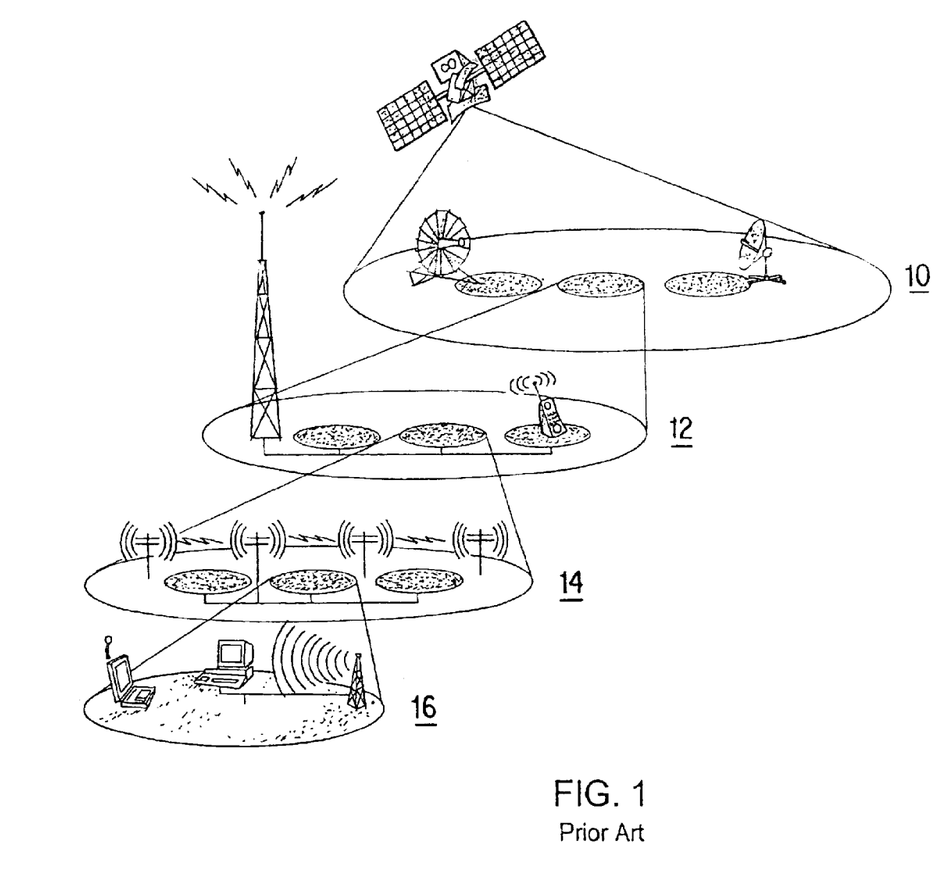
FIG. 1 is a pictorial illustration of "prior art" wireless communication systems.

FIG. 1 provides a general illustration of the presently available wireless communication systems. They include regional area wireless networks 10, wide area wireless networks 12, metropolitan area networks 14, and local area networks 16. Regional area wireless networks 10 provide coverage over a large geographic region, such as the coverage provided by satellite based cellular communication networks and its cost varies greatly. Wide area networks 12 are exemplified by the existing land based cellular phone systems mentioned above. They provide coverage over a relatively large geographic region, but to a lesser extent than regional area networks because the wide area networks utilized land based base station systems that individually have only a small geographic coverage. To obtain the wide area coverage, multiple base station systems must be spread throughout the coverage area with some degree of overlap in coverage. Thus, the geographic coverage provided by a given cellular phone system is often determined by population density and/or travel density in that locating base station systems in sparsely populated, lightly traveled geographic areas may not be cost justified. Metropolitan area networks 14, as the name implies, provide coverage only in metropolitan areas. The most well known type of metropolitan area network is Metricom's Richochet2 network architecture. Wireless local area networks 16 provide very limited geographic coverage, typically on the order of 100 yards or less. Because of this limited geographic coverage, wireless local area networks have not been used to any extent in mobile communications and their application has been pretty much limited to use in office environments and the like where the work stations that are connected to the wireless local area network are located in close proximity to each other. One such of wireless local area network is the 802.11 wireless LAN.

Initially, when the cellular systems first became popular, the wide area network AMPS network was used. More recently, cellular systems have added the second-generation digital networks to the wide area networks being used as well as the satellite based regional area networks and the metropolitan area networks. As these additional networks have been added to the networks available for mobile communication use, cellular in particular, mobile communication devices such as newer generation cell phones have been provided the capability to switch between various networks. For example, a cellular phone can utilize the first generation AMPS network or the second generation digital networks (such as GPRS, GSM and CDMA), and even the satellite based networks.

When the mobile communication device switches among wireless networks, this is known as vertical handoff. A simple form of vertical hand-off would involve a cell phone having multi-network capability selecting which network to use based upon factors such as cost, availability and performance and switching to a second network if coverage from the first network is lost. Vertical handoff is more than just the ability to use more than one wireless network. In this regard, the cellular phone must maintain the same phone number even when it has switched networks. For example, a user having a cell phone that has both analog and digital capability might select the digital network if it was available because it has better quality than the analog network, but select the analog network if digital coverage was not available. (In today's environment, the analog network has broader coverage than digital coverage.)

More sophisticated mobile communication devices will perform the vertical handoff automatically. For example, if a cellular phone has tri-mode capability of using the analog network, digital network, and satellite network, the phone might select the network to use based in order of preference and availability. The user would have entered an order of preference into the phone telling it to use the analog network if its available, then the digital network and then the satellite network. Assuming that the phone first connected to the analog network, the phone would switch to the digital network if the user moves out of the analog coverage area, and then to the satellite network if the user moves out of both the analog and digital coverage area. Typically, the phone decides to switch based upon whether it is in the coverage area of a given network usually determined by signal strength from the network's antennas. One of the problems that this technique has is that by the time a determination is made that the network being used should be switched, there may be a loss of service due to the time that it takes to make the switchover. Also, if the switch is from a more expensive network to a lesser expensive network, such as from the satellite network to either the digital or analog network, the switch from the satellite network may not be accomplished when the user first enters the coverage area for the analog or digital network, resulting the user paying longer than necessary for the more expensive satellite network.

Vertical handoff is a well-understood technology in the mobile computing field. In general, it is about how to automate the connection status and routing table updates on top of the mobile Internet Protocol (Mobile IP) technology. However, due to the unpredictable nature of wireless network boundaries, there is often an abrupt cut-off of service when the boundary is reached. Consequently, the overall direction of vertical hand-off research is generally focused on quick recovery schemes, such as preventative multicast to neighboring base stations.

Accordingly, it is an objective of the present invention to provide a predictive method of achieving seamless vertical handoff in a wireless communication system.

It is a further objective of the present invention to utilize the bandwidth available with local area networks for mobile communication, even though the geographic coverage of local area networks is limited.

SUMMARY OF THE INVENTION

In order to achieve the forgoing objectives, a method is provided for selecting which of a plurality of wireless communication options will be used by a mobile communication device based on the location of the mobile communication device on a route, the route, and the availability for use of each of the plurality of wireless communication options along the route. In a further embodiment of the inventive method, information indicative of coverage areas for the wireless communication options available along the route are stored in a database by storing boundary locations of the coverage areas for the wireless communication options along the route where the boundary locations stored are boundary locations that are on streets of the route. In a further embodiment, updated information about the coverage areas is periodically obtained and the database updated accordingly.

In another embodiment of the invention, a uniform content layer application program interface is provided for application programs that use mobile communication provided by a mobile communication device. Information concerning any wireless communication options that are available for use by the mobile communication device as it traverses a route is stored in a database. The application program decide which wireless communication option to use based upon the information about the wireless communication options in the database.

In a further embodiment of the invention, a method of fueling a vehicle with information through a wireless communication device in the vehicle is provided. A predicted time when the vehicle will be able to communicate with an info-fueling station having a predictable geographic position is determined. A request for information from the vehicle is sent through the wireless communication device to at least one wireless communication network. The information is routed from an information source in communication with the wireless communication network to the info-fueling station. The requested information is downloaded to the vehicle through the info-fueling station during the time that the wireless communication device in the vehicle is in communication range of the info-fueling station.

BRIEF DESCRIPTION OF THE DRAWINGS

The present invention will become more fully understood from the detailed description and the accompanying drawings, in which.

DETAILED DESCRIPTION OF THE PREFERRED EMBODIMENTS

Figure 2:
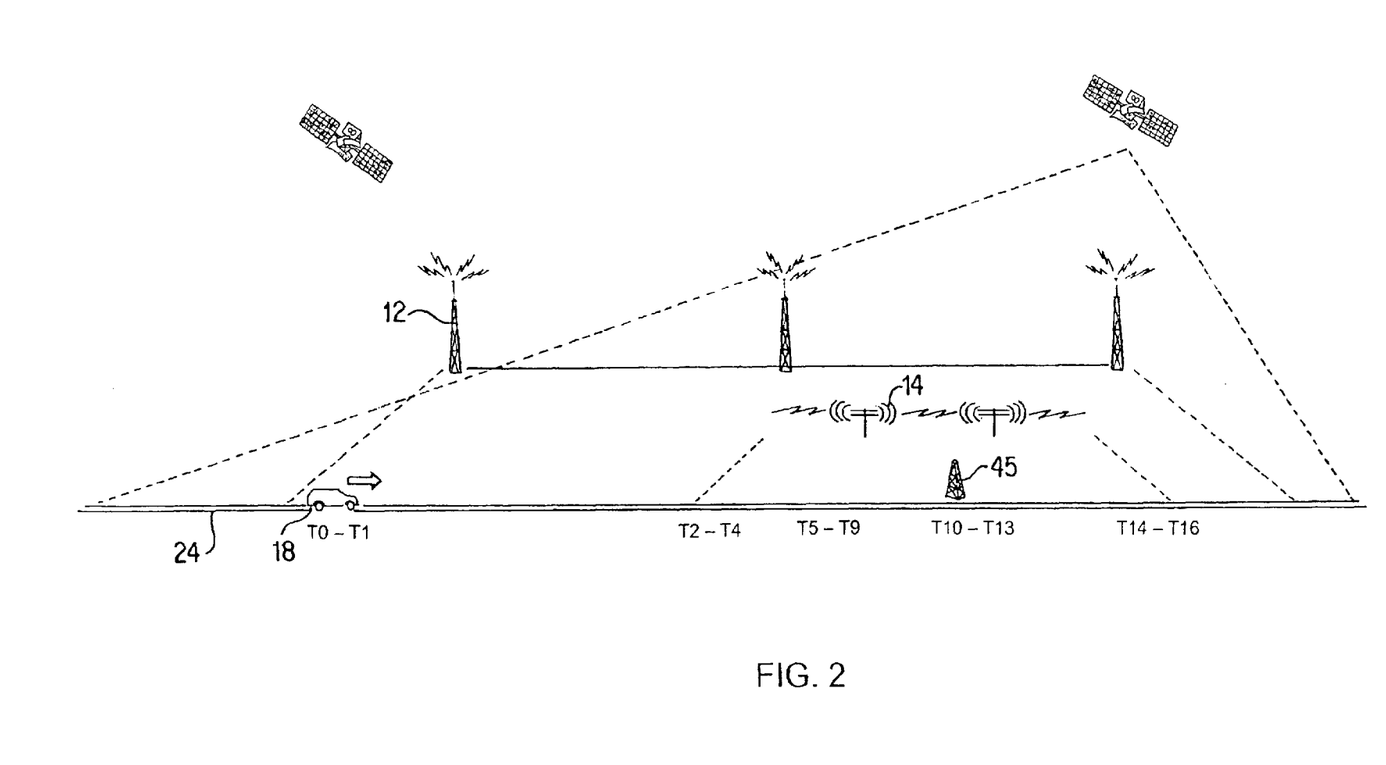
FIG. 2 is a systems interaction diagram of an embodiment of the present invention.
Figure 3:
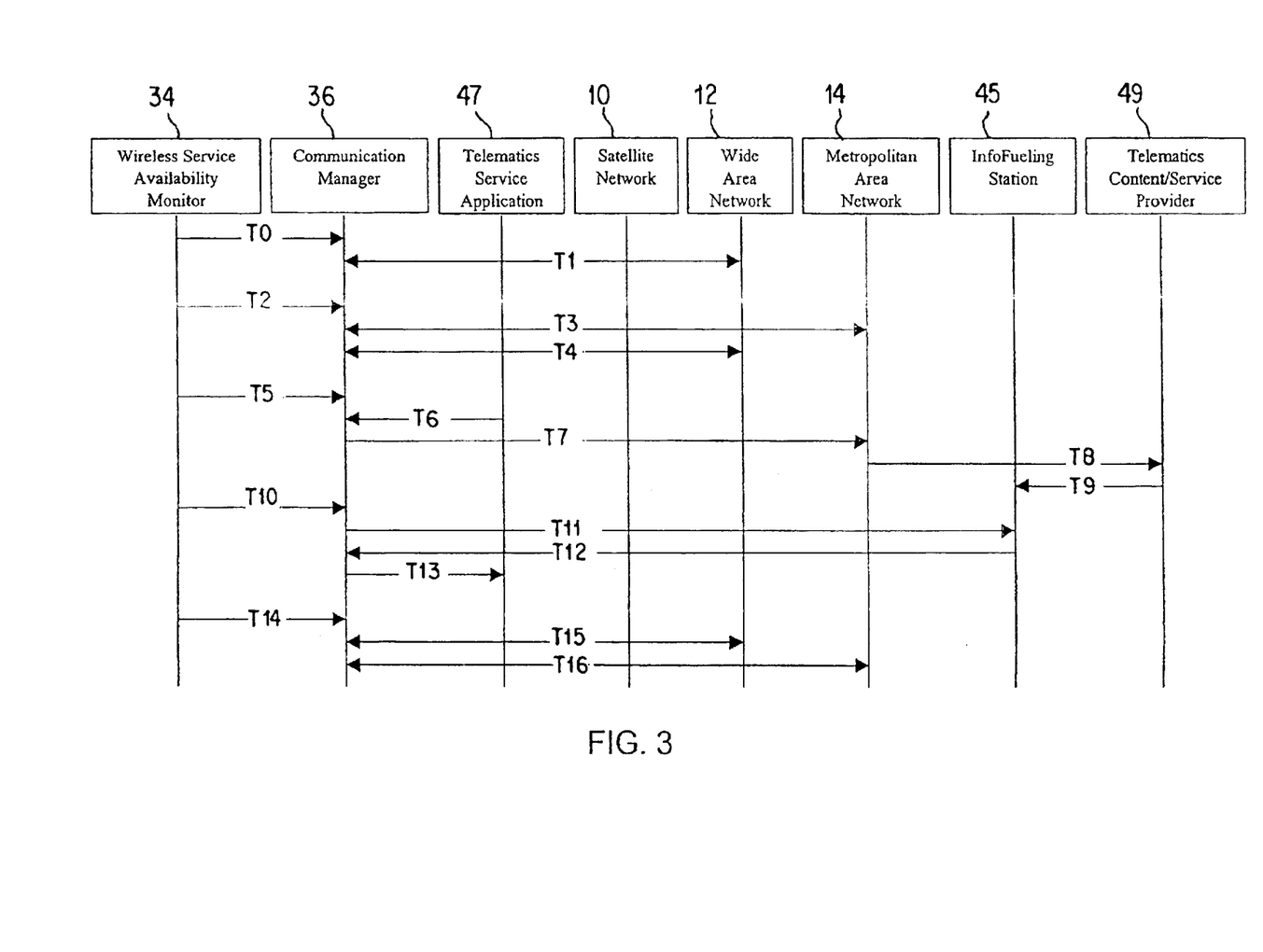
FIG. 3 is a pictorial illustration of wireless communication options used in the method of FIG. 2.

Referring to FIGS. 2 and 3, the route-based communication planning method of according to the present invention is described. (The elements of FIG. 1 that are common to FIGS. 2 and 3 are identified with the same reference number.) This method is particularly advantageous for use with mobile wireless data communication applications, such as telematics applications, where data is being transmitted to and from the vehicle and will be described in that context, although the method is not limited to mobile wireless data communication applications.

A vehicle 18 has a mobile data communications device 20, illustratively, a computer having one or more wireless modems. This computer could be an off the shelf computer, such as a notebook computer, a personal digital assistant, or a computer built into the vehicle or another mobile device (e.g., a cellular phone having data communication capability). The mobile communications device 20 has a communication availability monitor 34 which has a database of wireless communication network coverage information 22 (shown representatively in FIG. 4) and a communication manager 36. Vehicle 18 also has a navigation system 26, such as that currently available in Mercedez-Benz vehicles. The navigation system 26 provides information describing a route 24 that the vehicle traverses and the location of the vehicle in the route, which it determines in a known fashion, such as from information obtained from a global positioning satellite 28.

As vehicle 18 traverses route 24, the mobile data communications device 20 is checking to determine what wireless communication networks and systems are available at particular points in the route, as described in more detail below. Based on the availability of the various wireless communication networks, the mobile communications device 20 determines which one it should use when it reaches each particular point and more specifically, if it should switch networks. If mobile communications device 20 determines that it should switch networks, such as from WAN 12 to MAN 14, it initiates the vertical handoff. Preferably, it does so in advance of reaching the predetermined point in the route, so that when the vehicle 18 reaches the predetermined point, the vertical hand-off occurs seamlessly and with minimum delay. Illustratively, the mobile communication device 20 knows how much time it takes to accomplish the vertical hand-off and, based on data such as the vehicle speed and the route the vehicle will take to reach the particular point, and initiates the request for the vertical handoff an appropriate amount of time in advance of the vehicle reaching the particular point so that the vertical handoff occurs seamlessly when the vehicle reaches the predetermined point.

More specifically, when vehicle 18 starts, communication availability monitor 34 obtains information about route 24, illustratively from an external source such as the vehicle's navigation system 26. It then creates a database of the coverage areas of the wireless networks and systems that mobile communication device 20 can use as it traverses route 24. Communication availability monitor 34 at T0 informs communication manager 36 what wireless networks and systems are available, which in the example of FIGS. 2 and 3, are WAN 12 and satellite network 10. Communication manager 36 then determines which wireless network to use, illustratively WAN 12 for reasons such as better cost or performance, and at T1 connects mobile communication device 20 to WAN 12.

As vehicle 18 traverses route 24, it reaches a point along the route that is a coverage boundary for MAN 14, indicated at T2–T4 (or just before the coverage boundary), where MAN 14 coverage is available. At T2, communication service availability monitor 34 informs communication manager 36 that MAN 14 coverage is now available. Communication manager 36 determines, based on factors such as cost and performance, that the network to which mobile data communication device 20 is connected should be switched from WAN 12 to MAN 12. At T3, communication manager 36 connects mobile data communication device 20 to MAN 14 and after the connection is established, disconnects mobile data communication device 20 from WAN 12 at T4.

Skipping to T14 (T5–T13 are described below), when communication service availability monitor 34 determines that the vehicle will travel out of the coverage area for MAN 14 within a certain period of time, such as thirty seconds, it informs communication manager 36. At T15, communication manager 36 connects vehicle 18 to WAN 12, which communication manager determined was the best available choice, and at T16, disconnects vehicle 18 from MAN 12.

Figure 5:
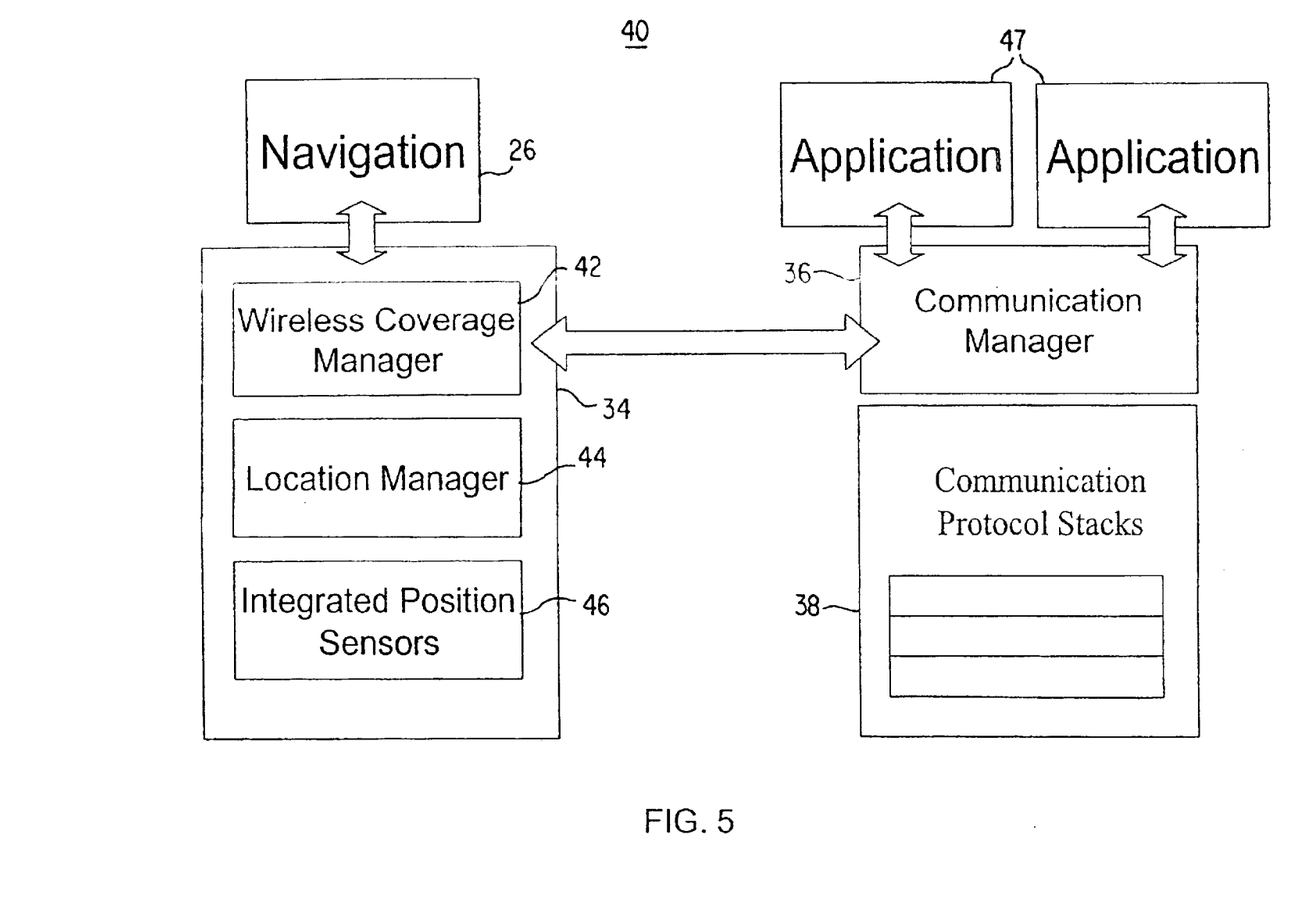
FIG. 5 is a block diagram of a route-dependent communication planning architecture according to an embodiment of the present invention.

Referring to FIG. 5, an illustrative architecture 40 for the route dependent communication planning invention is shown. Architecture 40 includes wireless service availability monitor 34, communication manager 36 and communication protocol stacks 38, all of which are illustratively implemented in software as part of mobile communication device 20. Wireless service availability monitor 34 includes wireless coverage manager 42, location manager 44 and integrated position sensors 46. Integrated position sensors 46 are illustratively known types of position sensors that can determine the geographic location of an object, such as an inertial guidance system, a GPS system, and can also comprise an interface with the navigation system 26 of vehicle 18. Architecture 40 also includes navigation system 26, that is coupled to wireless coverage manager 42, and one or more applications 47 that communicate with communication manager 36 as described below.

Although shown separately from wireless coverage manager 42 in FIG. 5, location manager 44 and wireless coverage manager 42 logically interact to the point where they can both be considered part of wireless coverage manager 42. Location manager 44 keeps track of the current location of vehicle 18 and notifies wireless coverage manager 42 when vehicle 18 reaches a location registered by wireless coverage manager 42. Wireless coverage manager 42 maintains network coverage database 22 and issues commands to communication manager 36 to initiate route based vertical hand-off. Integrated position sensors 46 obtain data indicative of the vehicle's geographic position, such as latitude and longitude, from sources such as the vehicle's navigation system 26 regarding the route 24 and the location of vehicle 18 on route 24.

Figure 4:
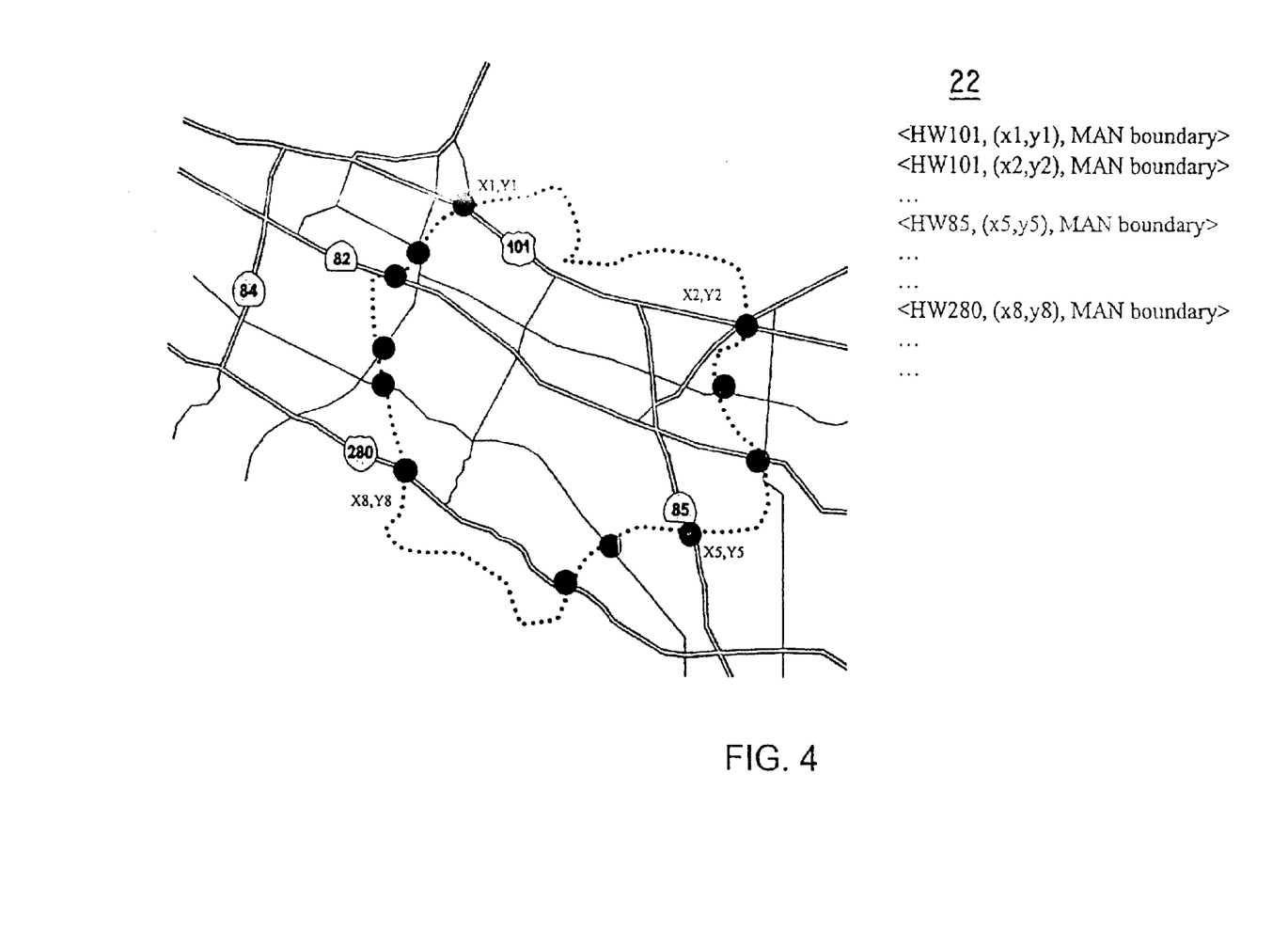
FIG. 4 is a pictorial representation a wireless coverage database record format in accordance with an embodiment of the present invention.

As mentioned, wireless coverage manager 42 maintains network coverage database 22 (FIG. 4). Information regarding the coverage for each particular network is obtained from available sources, such as the network provider and signal strength monitoring by mobile communication device 20. Illustratively, this information is obtained by communication manager 36 and passed on to wireless coverage manager 42 for processing and eventual storage in network coverage database 22. From this information, the boundary locations of the network coverage on all the streets are determined and these boundary locations stored in network coverage database 22.

Figure 6:
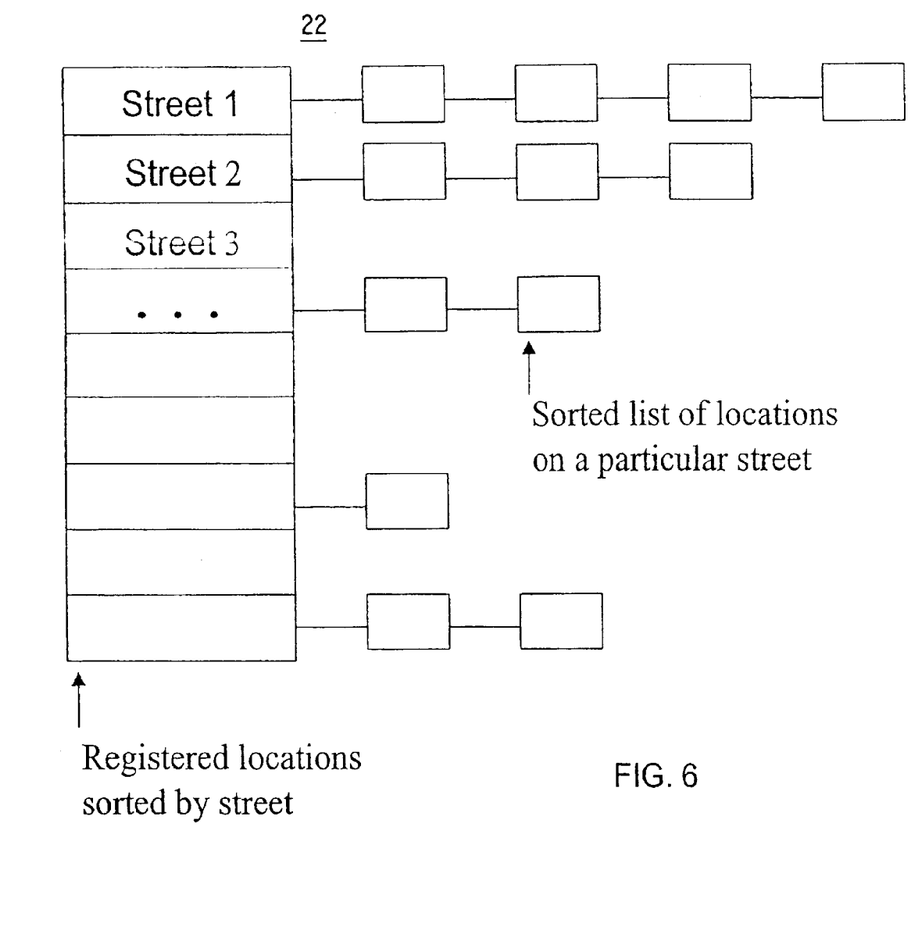
FIG. 6 is a schematic of a data structure for monitoring and reporting wireless coverage along routes in accordance with an embodiment of the present invention.

In an illustrative embodiment, the streets are divided into sections where a street section is a portion of a street in a digital map used in the navigational software used by the vehicle's navigational system 26. Each street section is illustratively identified with a unique integer, which allows easy sorting of the whole database by street. Network boundary locations are the locations on particular street sections where boundaries for the wireless networks lies. Latitude and longitude values, illustratively obtained by integrated position sensors 46, are stored to pinpoint each boundary location. A radius is also specified for each boundary location so that its location is precisely specified. An illustrative organization of database 22 is shown in FIG. 6.

Wireless coverage manager 42 also updates the network coverage database 22 as updated network coverage information is received, such as from communication manager 36. Wireless coverage manager 42 illustratively reacts to updated coverage information in one of two ways. If the update is for a location not presently in network coverage database 22, wireless coverage manager 42 processes and stores it in network coverage database 22 in the manner described above. If the update is for a location that is presently in network coverage database 22, it compares the information for that location stored in network coverage database 22 with the update information (as processed), and if the update information is different, updates the information in network coverage database 22 for that location.

Preferably the running average method is used to make the update. The location value generated by the running average method lies somewhere between the old value and the update value. The exact position is determined by a parameter, illustratively determined heuristically, that shifts the location value a certain percentage toward the update location value. In this way, an abnormal update value would not destroy the integrity of the network coverage database. If the update value persists in subsequent updates, then the value stored in the network coverage database for that location will eventually align itself to the update value.

Wireless coverage manager 42 also predicts the network coverage for a particular route. Information regarding route 24 that vehicle 18 is taking can be read in from a file or, as discussed above, obtained from the vehicle's navigation system 26. Wireless coverage manager 42 then develops a list of wireless network and systems boundary locations along route 24 that vehicle 18 is traversing and registers this list with location manager 44, e.g, communicates the list to location manager 44 which stores it. Wireless coverage manager 42 also determines route turning points and registers these points with location manager 44. When wireless coverage manager 42 is notified by location manager 44 that a registered location is about to be reached, as described below, it checks to see if this registered location is a network boundary and if so, whether it is appropriate to switch networks. It may be that the preferred network is being used and the network boundary about to be reached is for a different network. Also, it may be that even if the preferred network is not being used and the registered location about to be reached is a network boundary for the preferred location, the amount of time that the vehicle will be in a coverage area for the preferred network is so small that switching is not justified. If coverage manager determines that networks should be switched, it sends a command to communication manager 36 to initiate the vertical hand-off to switch networks.

Location manager 44 accepts the list of boundary locations along route 24 from wireless coverage manager 42 and stores it. Each location is specified in terms of the following information:

Street section (same information that is stored in the network coverage data base 22 for the particular street section)

Latitude, longitude (the location that location manager monitors for)

Notification radius (specifies how far ahead of reaching the registered location either in distance or in time that location manager 44 notifies the registering component, usually, wireless coverage manager 42)

Notification status (specifies whether this location should be continuously monitored or if it is to be checked one time only)

Call back address (handler through which location manager 44 gives the notification)

Illustratively, the data base structure for the database where location manager 44 stores the registered location information is very similar to the structure of network coverage database 22.

Location manager 44 also obtains information regarding the street on which vehicle 18 is traveling from an external component, such as vehicle navigation system 26. Each time vehicle 18 turns onto a new street, location manager 44 accesses its database for the list of registered locations on the new street and uses this list as the monitoring list.

Figure 7:
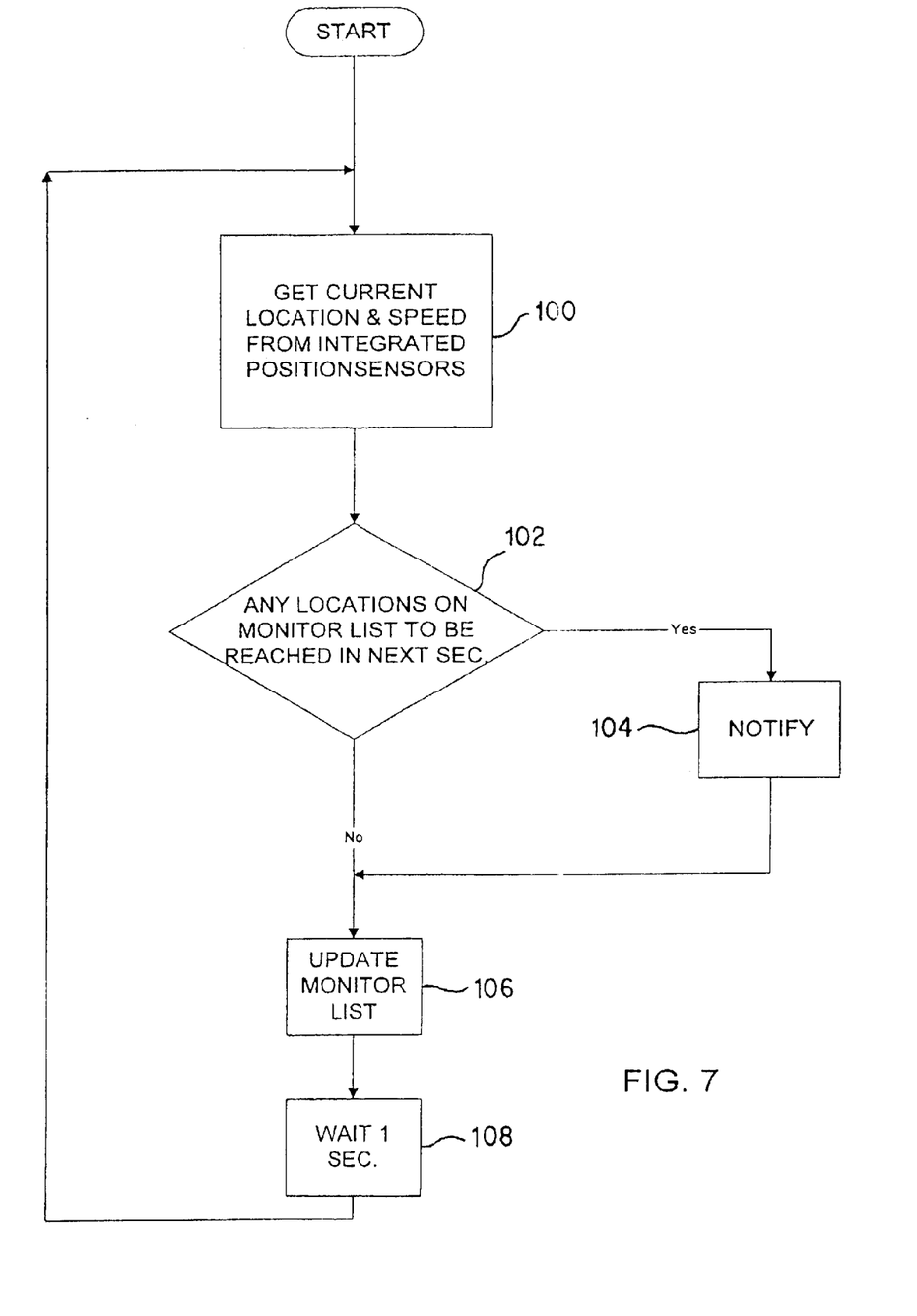
FIG. 7 is a flow chart of a monitoring routine used in an embodiment of the present invention.

FIG. 7 is an illustrative monitoring routine used by location manager 44. At step 100, location manager 44 obtains the current location of vehicle 18 and its speed from integrated position sensors 46. At step 102, location manager 44 determines whether any of the locations in the monitoring list will be reached in the next time period, illustratively, one second. Location manager 44 makes this determination illustratively based on the speed of vehicle 18. In this regard, the speed information obtained by location manager 44 from integrated position sensors 46 is illustratively averaged with the prior speed information, using the running average method, and the averaged speed used to make the determination of whether a registered location will be reached in the next time period, illustratively, one second. This prevents the use of speed information that might not be representative of the speed of the vehicle over the next second, which might be the case in the event of quick braking or acceleration. If location manager 44 determines that a registered location will be reached in the next time period, it notifies the component that registered the location, usually wireless coverage manager 42, at step 104, and proceeds to step 106. If not, location manager proceeds to step 106. At step 106, location manager updates its monitoring list if appropriate, such as removing a registered location that was reached if it was registered for one time notification only. Location manager then waits for one time period at 108 and returns to step 100 and starts the monitoring routine over. Once the vehicle travels within the radius for the registered location, location manager 44 notifies the registering component that the registered location has been reached.

Figure 10:
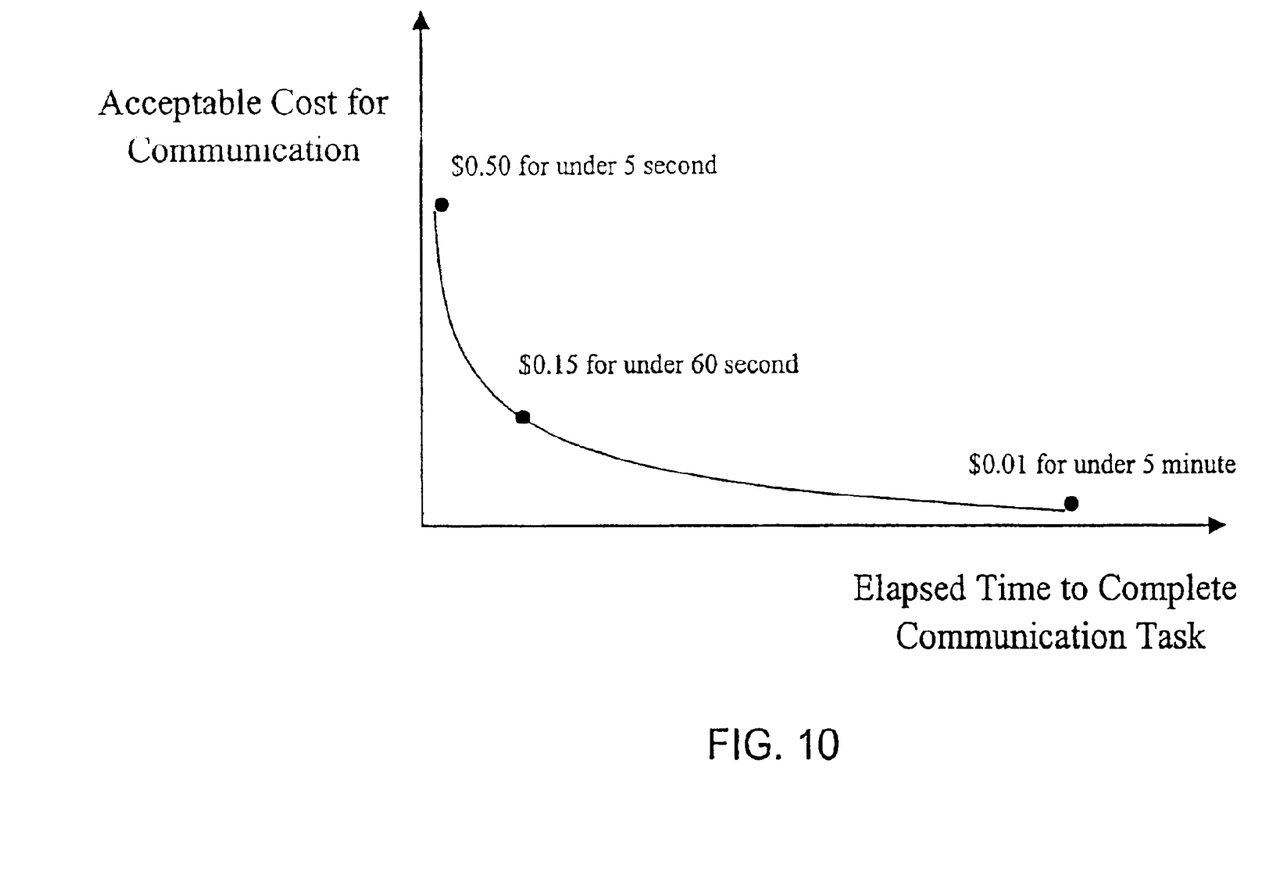
FIG. 10 is an illustrative graph showing how an application may describe its preferred wireless communication requirements in accordance with an embodiment of the present invention.

FIG. 10 is a graph showing an example of how applications 47 can interact with communications manager 36 to describe its communication requirement. This figure shows time to obtain content versus acceptable cost. This curve could be implemented as part of an application 47, as part of communication manager 36 and accessed by each application 47 via communication manager 36, or as a separate database to which each application 47 has access. An application 47 illustratively decides to request all the content from the current day's Internet edition of a major newspapers. The application 47 then can use the curve of FIG. 10 to decide the amount of time to request that the content be obtained in. For example, the requesting application 47 can review the curve of FIG. 10 and determine that the content can be obtained in less than five seconds at a cost of $0.50 or obtained in less than five minutes at a cost of $0.01. Since a ten minutes difference in delivery time makes little difference when dealing with news content published daily, the application 47 requests communication manager 36 to obtain the content within ten minutes at the lowest possible cost. Communication manager 36 then utilizes this information in determining which wireless service to use to obtain the content and when to use it. This interaction process between applications 47 and communications manager 36 will be termed herein as the unified content access layer API (applications program interface).

In an illustrative embodiment, the curve, such as shown in FIG. 10, would not need to be defined in its totality, but could be approximated by a few points, such as the highest cost/shortest time, median cost, median time, and lowest cost/longest time. Also, in the example of FIG. 10, the factors considered are cost versus time, but it should be understood that these factors are illustrative only and the decision curve used by communication manager 36 can include other or alternative factors, such as power consumption, security, and others, and the methodology described will be equally applicable.

The key importance of FIG. 10 is that it shows a particular method to design and implement the API for unified content access layer. The unified content access layer is mainly composed of communication manager 36 and various other supporting components such as wireless service availability monitor 34. The general method to communicate in today's Internet is the TCP/IP socket based programming model in which an application interacts with the operating system's TCP/IP stack and open TCP channels for communication with other network computers. This model is fully supported by the unified content access layer. By allowing applications to describe their communication requirements such as cost and performance, the direct TCP/IP socket based communication method is even enhanced because wireless network options will be chosen accordingly to accommodate each application's needs. Furthermore, a general delayed communication transaction model will be provided to applications so that they can simply request the sending and receiving of some data objects. This model is similar to FTP or HTTP GET method, in which an application describes a data object it needs to receive or send using a URL (for example a web page address) to the communication manager along with its requirement as shown in FIG. 10. The communication manager is in turn responsible for using the best wireless communication method at right place/time for the applications in the right order to attempt to satisfy all the applications' needs.

In particular, an application now has an API for the following features:

1. An application can describe its communication requirements in terms of duration, bandwidth, cost, etc. to the unified content access layer.
2. The unified content access layer can describe the available wireless options along the route and a general wireless communication quality prediction to the applications so that they would be able to decide when to use a particular wireless option.
3. An application can now describe a data object for sending/receiving and associated timing and cost requirements to the unified content access layer. The unified content access layer will find the best way to achieve the requests received from all the applications.

Figure 8:
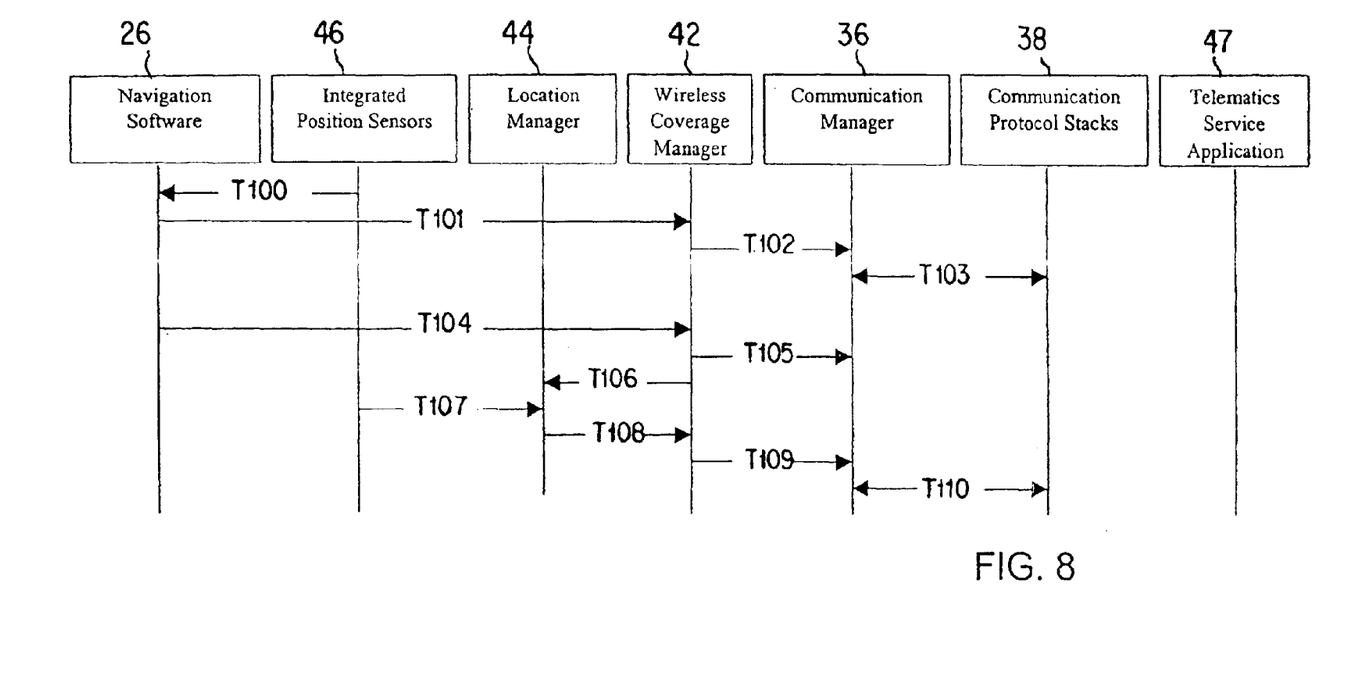
FIG. 8 is a system interaction diagram of a method of performing route dependent vertical handoff in accordance with an embodiment of the present invention.
Figure 9:
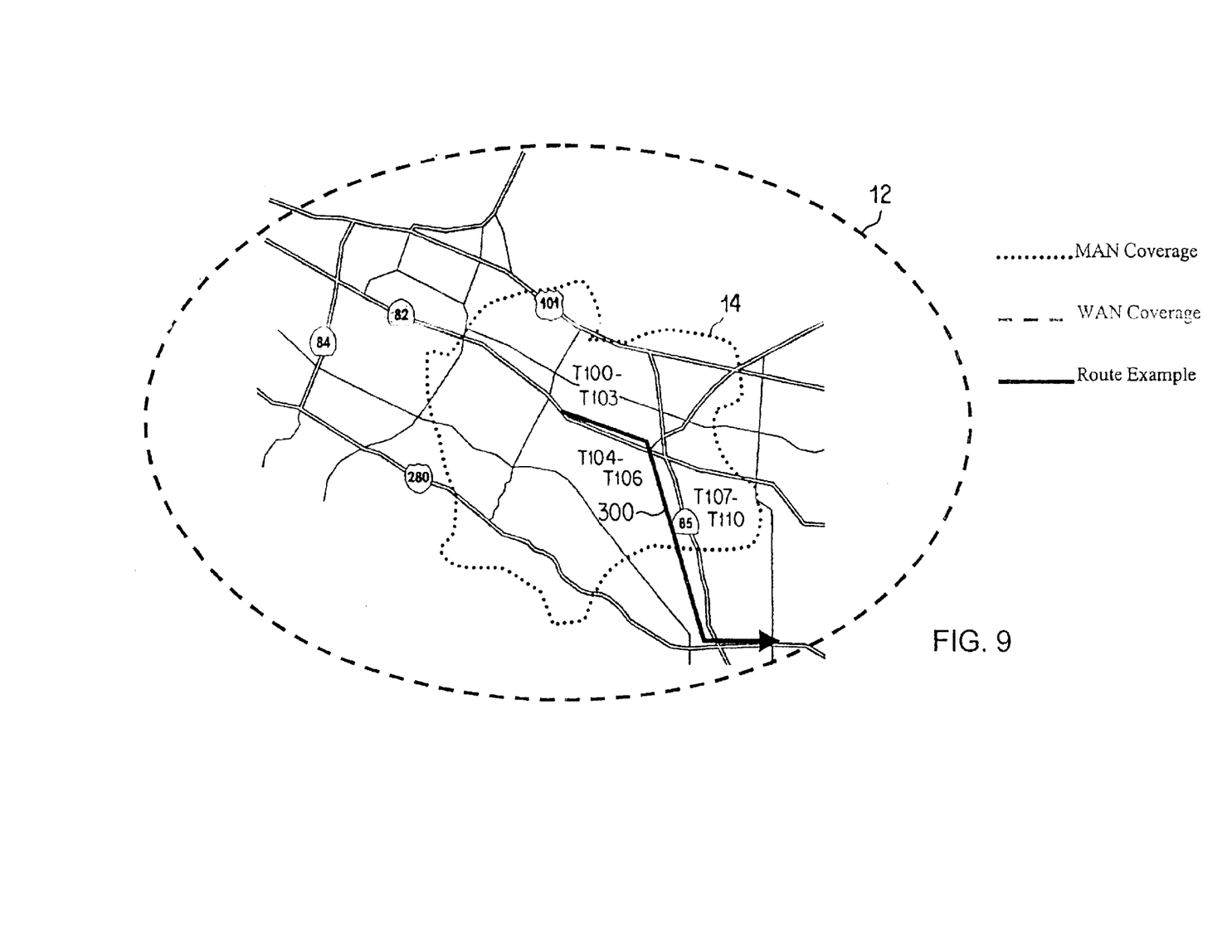
FIG. 9 is a map of the route traversed by a vehicle containing a wireless communication device with reference to FIG. 8.

An example of the interaction of elements of architecture 40 is described with reference to FIGS. 8 and 9. At T100, vehicle 18 (not shown in FIGS. 9 and 10) starts and navigation system 26 determines the location of vehicle 18 on route 300, illustratively, the street location that vehicle 18 is at. At T101, navigation system 26 passes this information, such as vehicle 18 is on highway 82 at location (x,y), to wireless coverage manager 42. At T102, wireless coverage manager 42 looks up what wireless services are available at this location in network coverage database 22, which in the example shown in FIGS. 9 and 10, is MAN and WAN, and passes this information to communications manager 36. At T103, communication manager 36 decides which wireless service to use, which in the example shown is MAN, based on factors such as cost and performance.

At T104, navigation system 26 figures out the details of route 300 and passes this information to wireless coverage manager 42, such as vehicle 18 will travel south on highway 82 for ten minutes, turn south onto highway 85 and travel south on highway 85 for fifteen minutes, turn south on highway 280 and travel south on highway 280 for twenty minutes, and so on. At T105, wireless coverage manager 42, using the details about route 300 passed to it by navigation system 26, accesses network coverage database 22 and develops a prediction of the wireless communication services availability for route 300, for example, as vehicle 18 travels route 300, it will have seventeen minutes of MAN coverage availability and thereafter will only have WAN coverage available. At T106, wireless coverage manager 42 requests location manager 44 to monitor for the MAN coverage boundary on highway 85.

At T107, navigation system 26 informs location manager 44 of the location of vehicle 18 on route 300 and its speed. At T108, location manager 44 determines that vehicle 18 is about to cross the MAN coverage boundary on highway 85 and informs wireless coverage manager 42 that vehicle 18 will cross the MAN coverage boundary on highway 85 in a certain time, such as ten seconds. At T109, wireless coverage manager 42 informs communication manager 36 that vehicle 18 will travel out of the MAN coverage area in the certain period of time, such as ten seconds, and of the wireless communication services that will be available when that occurs, which in the example shown is WAN coverage. At T110, communication manger 36 instructs communication protocol stacks 38 to switch to WAN before the MAN connection is disrupted.

A further embodiment of this invention utilizes the bandwidth available with wireless local area networks, such as the 802.11 wireless LAN, to burst data to mobile communication device 20 in the vehicle 18. This method will be referred to herein as "Drive-By InfoFueling." As has been mentioned previously, wireless LAN technology has generally not been used for mobile data communication due to its very limited geographic coverage. However, many data communications do not need to be communicated to the mobile communication device 20 in real time. Therefore, InfoFueling Stations 45, which are LAN wireless base stations, can be spaced along streets and be used to burst data to the mobile communication device 20 at high speeds using the bandwidth available with LAN wireless technology, which is currently around 11 megabits per second, when the vehicle enters the coverage area of a LAN wireless base station. An InfoFueling Station 45 would illustratively comprise a computer, such as an Internet server type of computer, a wireless LAN system, and be connected to the Internet via a high speed Internet connection, such as a DSL connection, cable connection, or T1 connection. In this regard, it is important to know which InfoFueling Station's coverage area that the vehicle will encounter next and the route-based communication planning method described above can be effectively utilized to provide this information.

With reference to FIGS. 2 and 3, Drive-By InfoFueling will now be described As vehicle 18 traverses route 24, communication availability monitor 34 informs communication manager 36 at T5 that an Info-Fueling Station 45 will be reached in a certain period of time, such as five minutes. At T6, an application 47, such as a News Reader, sends a request to communication manager 36 that a large amount of content be downloaded from the content provider, such as all of the day's new stories from the Internet edition of a major newspaper, within a certain period of time, such as ten minutes and at the lowest cost. At T7, T8 communications manager 36 requests through the current wireless network connection, MAN 14 in the example shown, that content/ service provider 49 (which is illustratively the server handling the Internet edition of the major newspaper) forward this content to the InfoFueling station 45 that vehicle 18 is approaching. In this regard, when communication manager 36 requests the content, it accompanies the request with the identity (illustratively, the EP address) of the InfoFueling Station 45 to which the content is to be transferred, which is the Info-Fueling Station 45 that vehicle 18 is approaching as advised by coverage manager 42.

At T9, content/service provider transfers the content to the specified InfoFueling Station 45 and the content is cached at the specified InfoFueling Station 45. Communication availability monitor determines when vehicle 18 enters the coverage area of that InfoFueling Station 45 and when it does, informs communication manager 36 at T10 that vehicle 18 has entered this coverage area. Alternatively, mobile data communication device 20 could determine when vehicle 18 enters the coverage area for that InfoFueling Station 45 based upon the signal strength of that InfoFueling Station 45. In any event, at T11 communication manager 36 requests that the InfoFueling Station 45 download the cached content to vehicle 18, which InfoFueling Station 45 does at T12. At T13, downloading is complete and the communication manager 36 transfers the downloaded content back to the application 47 requested it.

In another embodiment of the above Drive-By InfoFueling invention, the wireless LAN base stations, InfoFueling Stations 45, can be mobile and moved to locations to optimize the performance of Drive-By InfoFueling. For example, during rush hour, additional InfoFueling Stations 45 can be moved into the most heavily traveled areas to provide additional capacity, locate the InfoFueling Stations 45 closer together, and so forth.

Although the invention has been described in detail with reference to certain preferred embodiments and specific examples, variations and modification exist within the scope and spirit of the invention as described and as defined in the following claims.

What is claimed is:

1. A method of selecting which of a plurality of wireless communication options will be used by a mobile communication device, comprising the steps of:

(a) storing in a database information indicative of coverage areas for the wireless communication options along a route that the mobile communication device will be traversing, including storing boundary locations of the coverage areas for the wireless communication options along the route where the boundary locations stored are limited to boundary locations that are on streets of the route;

(b) determining at the mobile communication device where on the route that the mobile communication device is at as it traverses the route;

(c) accessing the database to obtain information regarding the communication options available alone the route;

(d) determining whether to switch from a first one of the wireless communication options presently being used to a second one of the wireless communication options when the mobile communication device approaches a boundary of a coverage area of one of the wireless communication options based on the wireless communication options available once the boundary is crossed and those that will be available further alone the route;

(e) switching from the first one of the wireless communication options to the second one of the wireless communication options if the determination was made to switch to that second one of the wireless communication options; and (f) obtaining updated information concerning the coverage areas of the wireless communication options and updating the database with the updated information, wherein one of the plurality of wireless communication options is not using any wireless communication, and wherein the step of obtaining updated information concerning the coverage areas of the wireless communication options includes obtaining this information from providers of the wireless communication options.

2. A method of selecting which of a plurality of wireless communication options will be used by a mobile communication device, comprising the steps of:

(a) storing in a database information indicative of coverage areas for the wireless communication options along a route that the mobile communication device will be traversing, including storing boundary locations of the coverage areas for the wireless communication options alone the route where the boundary locations stored are limited to boundary locations that are on streets of the route;

(b) determining at the mobile communication device where on the route that the mobile communication device is at as it traverses the route;

(c) accessing the database to obtain information regarding the communication options available along the route, (d) determining whether to switch from a first one of the wireless communication options presently being used to a second one of the wireless communication options when the mobile communication device approaches a boundary of a coverage area of one of the wireless communication options based on the wireless communication options available once the boundary is crossed and those that will be available further along the route;

(e) switching from the first one of the wireless communication options to the second one of the wireless communication options if the determination was made to switch to that second one of the wireless communication options; and (f) obtaining updated information concerning the coverage areas of the wireless communication options and updating the database with the updated information, wherein one of the plurality of wireless communication options is not using any wireless communication, and wherein the step of obtaining updated information concerning the coverage areas of the wireless communication options includes the mobile communication device monitoring signal strengths of the wireless communication options as it passes through the coverage areas for the wireless communication options and developing updated information concerning coverage areas for the wireless communication options based on the monitored signal strengths of the wireless communication options.

3. The method of claim 2 herein the step of updating the database with the updated information includes determining whether the updated information is for a location presently in the database,
(a) if the updated information is for a location not presently in the database, then storing the updated information in the database for the location;
(b) if the updated information is for a location presently in the database, comparing the updated information with the information stored in the database for the location and updating the stored information if updated information is different from the stored information.

4. A method of selecting which of a plurality of wireless communication options will be used by a mobile communication device, comprising the steps of:
(a) storing in a database information indicative of coverage areas for the wireless communication options alone a route that the mobile communication device will be traversing, including storing boundary locations of the coverage areas for the wireless communication options along the route where the boundary locations stored are limited to boundary locations that are on streets of the route;
(b) determining at the mobile communication device where on the route that the mobile communication device is at as it traverses the route;
(c) accessing the database to obtain information regarding the communication options available along the route,
(d) determining whether to switch from a first one of the wireless communication options presently being used to a second one of the wireless communication options when the mobile communication device approaches a boundary of a coverage area of one of the wireless communication options based on the wireless communication options available once the boundary is crossed and those that will be available further along the route;
(e) switching from the first one of the wireless communication options to the second one of the wireless communication options if the determination was made to switch to that second one of the wireless communication options; and
(f) obtaining updated information concerning the coverage areas of the wireless communication options and updating the database with the updated information, wherein one of the plurality of wireless communication options is not using any wireless communication, and wherein the step of updating the database with the updated information includes determining whether the updated information is for a location for which information is presently stored in the database,
(a) if the updated information is for a location not presently in the database, then storing the updated information in the database for the location;
(b) if the updated information is for a location presently in the database, comparing the updated information with the information stored in the database for the location and updating the stored information if updated information is different from the stored information.

5. The method of claim 4, wherein the step of updating stored information comprises shifting the stored information toward the updated information by a parameter and replacing the stored information with the shifted stored information.

6. The method of claim 5, wherein the step of updating the stored information comprises doing so with a running average method wherein the stored information is the running average of initial information and subsequent update information.

7. A method of storing data in a database that is indicative of coverage areas for wireless communication options alone a route that a mobile communication device is traversing, comprising the steps of
(a) storing boundary locations of the coverage areas for the wireless communication options along the route in the database where the boundary locations are boundary locations on streets of the route;
(b) periodically obtaining updated information at the location of the mobile communication device concerning the coverage areas of the wireless communication options as the mobile communication device traverses the route; and
(c) updating the database with the updated information, wherein the step of updating the database with the undated information includes determining whether the undated information is for a location for which information is presently stored in the database,
(a) if the updated information is for a location not presently in the database, then storing the undated information in the database for the location;
(b) if the undated information is for a location presently in the database, comparing the undated information with the information stored in the database for the location and updating the stored information if updated information is different from the stored information, and
wherein the step of updating stored information comprises shifting the stored information toward the updated information by a parameter and replacing the stored information with the shifted stored information.

8. A method of storing data in a database that is indicative of coverage areas for wireless communication options alone a route that a mobile communication device is traversing, comprising the steps of
(a) storing boundary locations of the coverage areas for the wireless communication options alone the route in the database where the boundary locations are boundary locations on streets of the route;
(b) periodically obtaining updated information at the location of the mobile communication device concerning the coverage areas of the wireless communication options as the mobile communication device traverses the route; and
(c) updating the database with the undated information, wherein the step of updating the database with the updated information includes determining whether the updated information is for a location for which information is presently stored in the database,
(a) if the undated information is for a location not presently in the database, then storing the updated information in the database for the location;
(b) if the undated information is for a location presently in the database, comparing the undated information with the information stored in the database for the location and updating the stored information if updated information is different from the stored information, and
wherein the step of updating the stored information comprises doing so with a running average method wherein the stored information is the running average of initial information and subsequent update information.

* * * * *